Feb. 15, 1966   P. H. KUEVER   3,235,124
MULTIPLE POINT, QUICK OPERATING FASTENER MEANS
Filed Sept. 30, 1963   6 Sheets-Sheet 1

PAUL H. KUEVER,
INVENTOR.

BY
Harold J. DeVeocoute
ATTORNEY.

Feb. 15, 1966        P. H. KUEVER        3,235,124
MULTIPLE POINT, QUICK OPERATING FASTENER MEANS
Filed Sept. 30, 1963        6 Sheets-Sheet 2
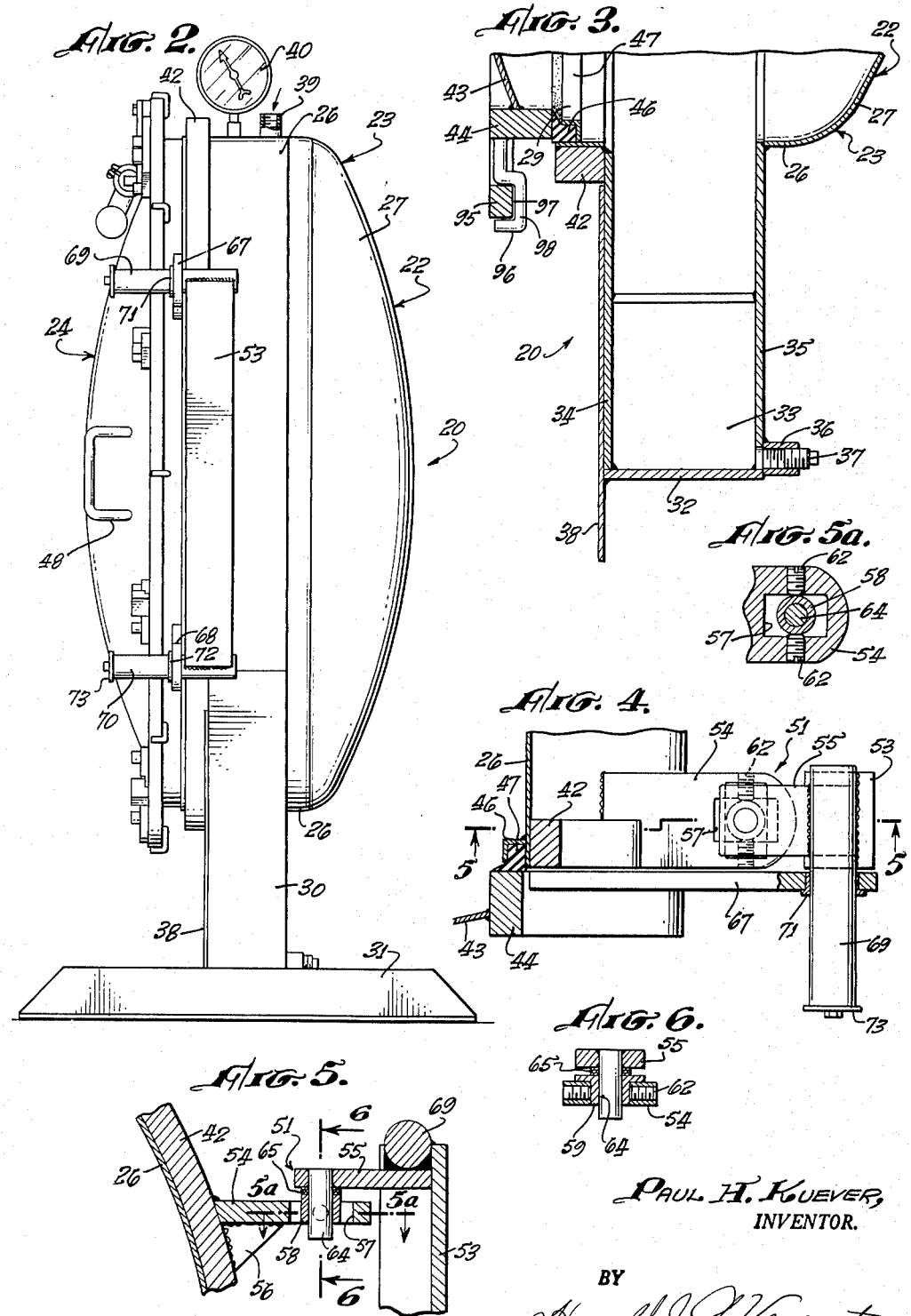
PAUL H. KUEVER,
INVENTOR.
BY
Harold J. LeVesconte
ATTORNEY.

Feb. 15, 1966 P. H. KUEVER 3,235,124
MULTIPLE POINT, QUICK OPERATING FASTENER MEANS
Filed Sept. 30, 1963 6 Sheets-Sheet 3
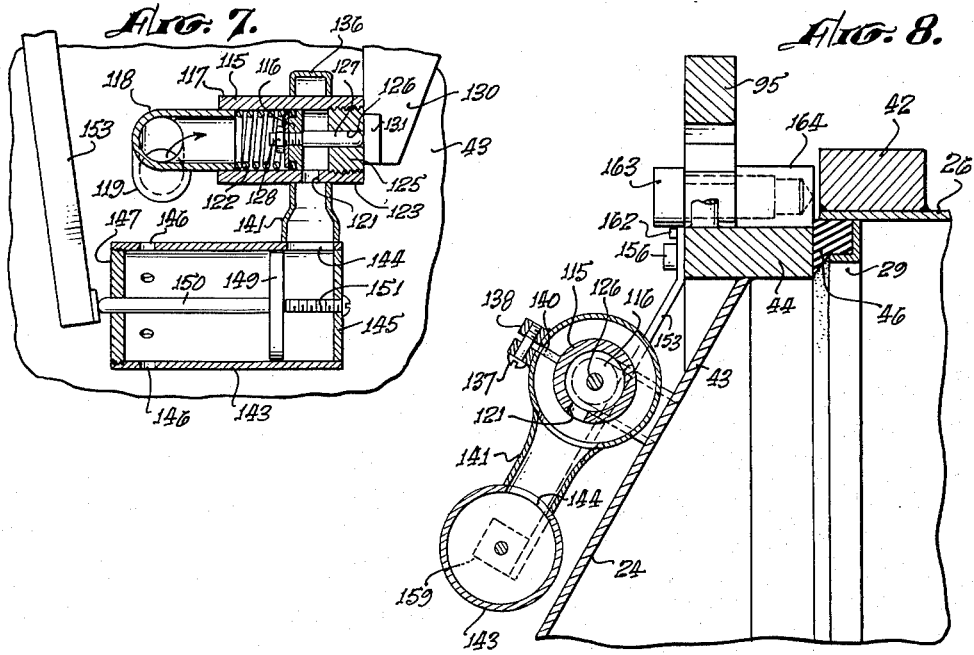
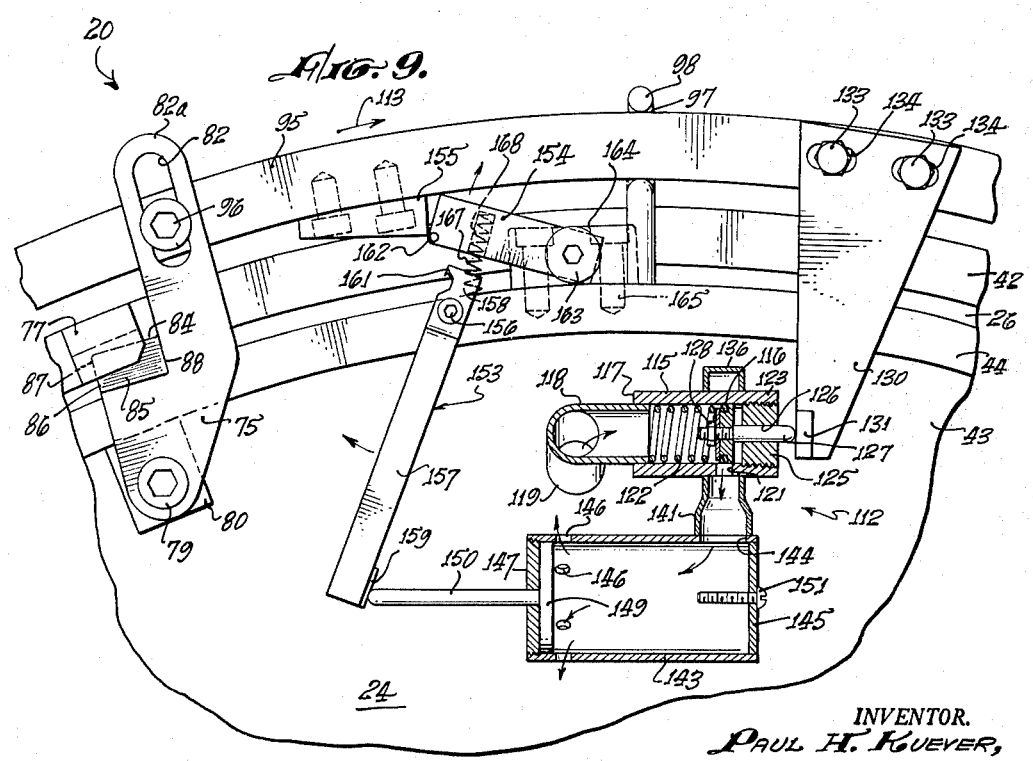
INVENTOR.
PAUL H. KUEVER,
BY
Harold J. LeVesconte
ATTORNEY.

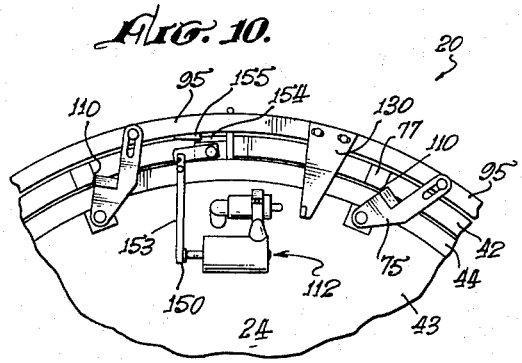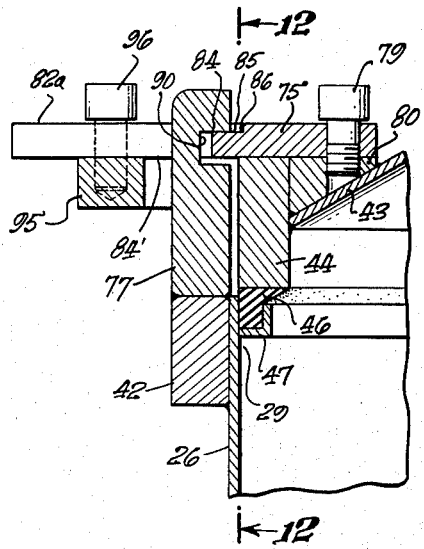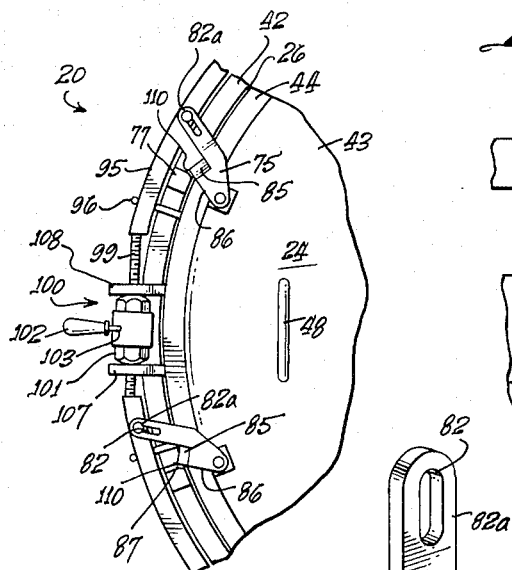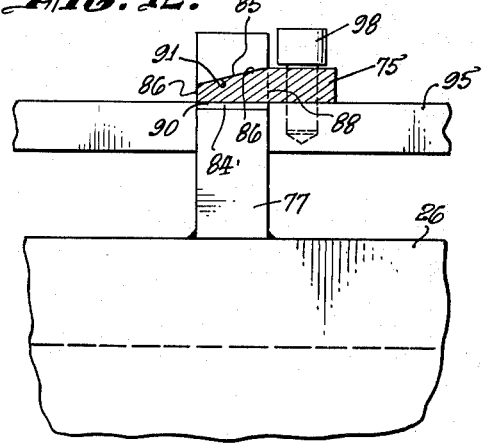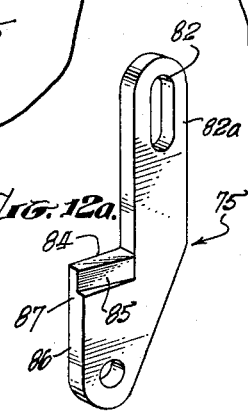

Feb. 15, 1966     P. H. KUEVER     3,235,124
MULTIPLE POINT, QUICK OPERATING FASTENER MEANS
Filed Sept. 30, 1963     6 Sheets-Sheet 5
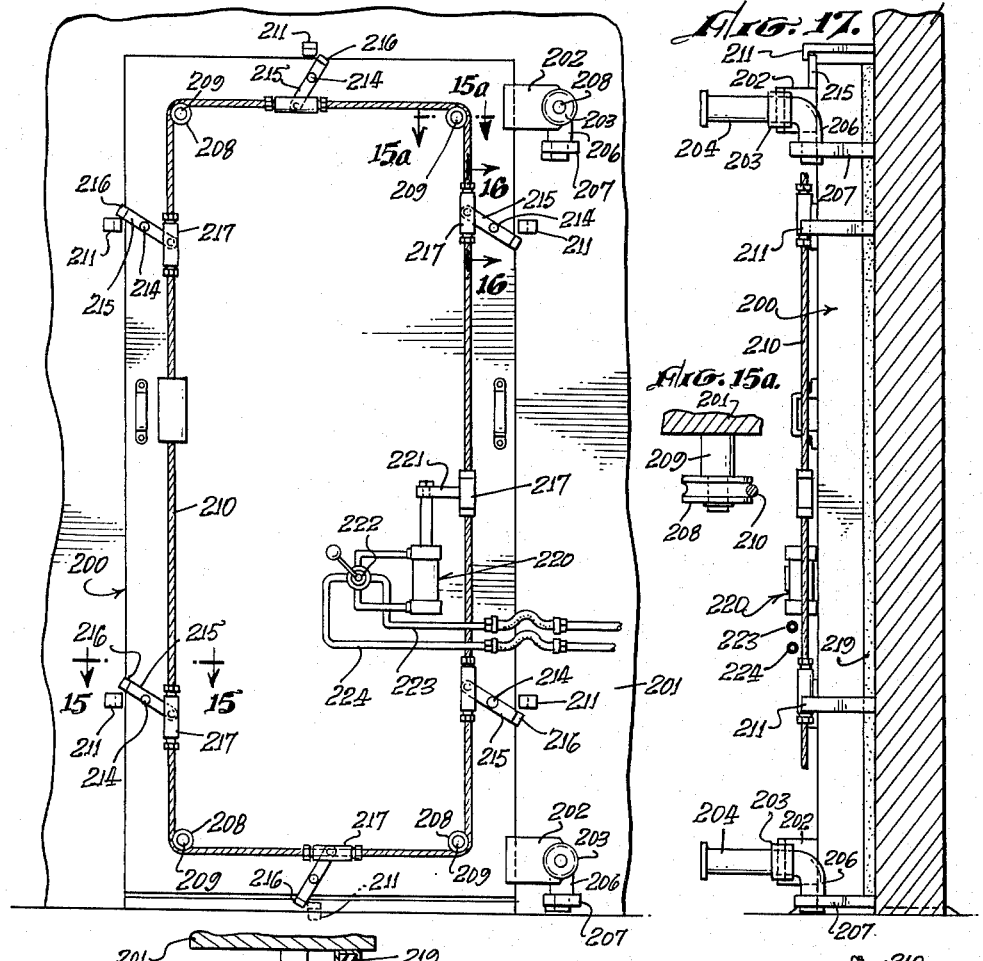
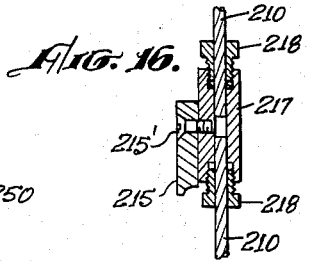
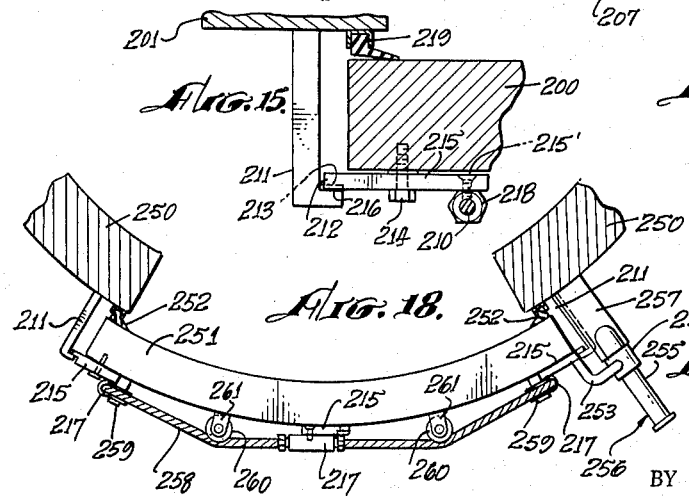
PAUL H. KUEVER,
INVENTOR.

Feb. 15, 1966 P. H. KUEVER 3,235,124
MULTIPLE POINT, QUICK OPERATING FASTENER MEANS
Filed Sept. 30, 1963 6 Sheets-Sheet 6
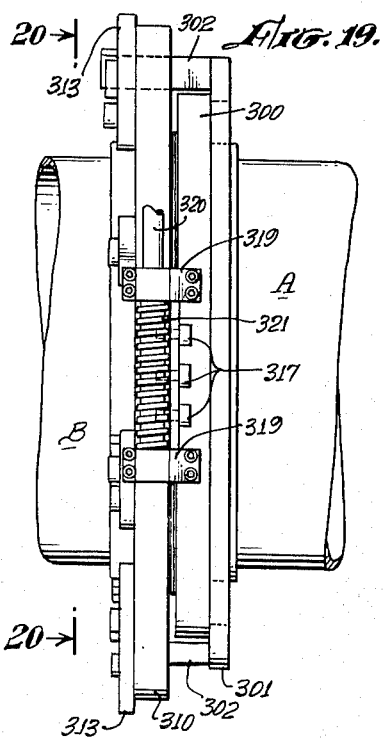
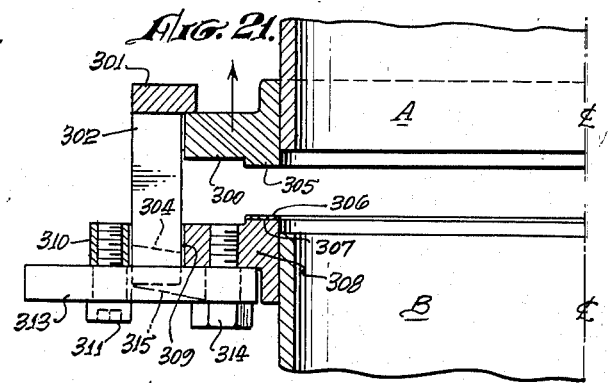
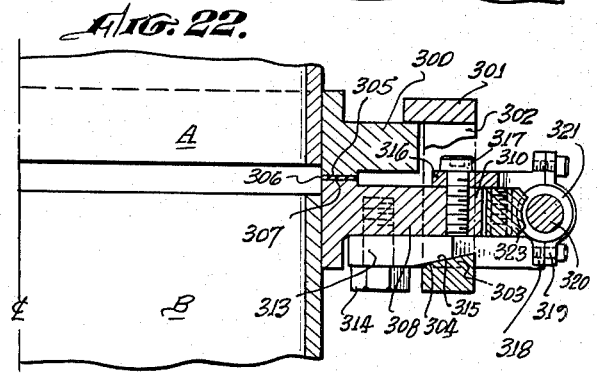
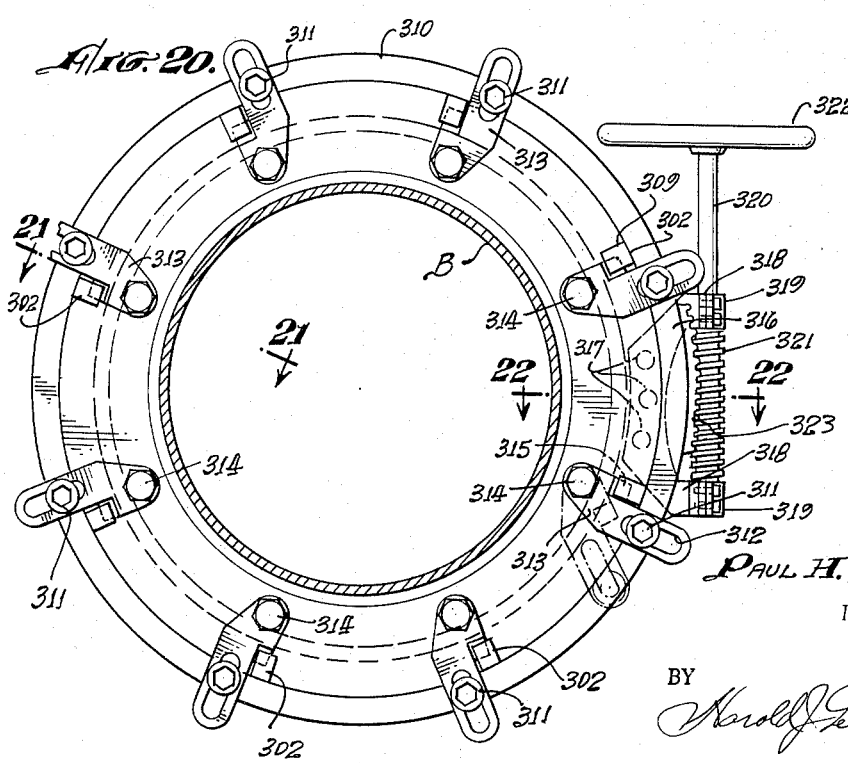
PAUL H. KUEVER,
INVENTOR.

United States Patent Office 3,235,124
Patented Feb. 15, 1966

3,235,124
MULTIPLE POINT, QUICK OPERATING
FASTENER MEANS
Paul H. Kuever, 3224 N. Figueroa St., Los Angeles, Calif.
Filed Sept. 30, 1963, Ser. No. 312,582
23 Claims. (Cl. 220—55.3)

This invention relates to quick-operating fastener means operating simultaneously at a plurality of points about the periphery of an opening and adapted, among other uses for securing a closure member or an opening in another member thereto whether the secured parts be rigidly connected or are separate and whether the openings and/or closure means are circular or non-circular in periphery or lie in flat or curved planes.

Pluralities of bolts and thumbscrews or fitted studs and nuts have been employed as fasteners for securing a door, for example, of a pressure vessel. Such fasteners of the bolt or screw type have to be tightened separately to close the receptacle and have to be loosened separately to open the receptacle. In connecting the openings in a pair of members together, particularly of large size, the opposed flanges of the coupled members are commonly releasably coupled by means of pluralities of bolts and nuts. Where high pressures are involved, such fasteners are disadvantageous not only because the operations for tightening and loosening the fasteners are time consuming, but more importantly, because fasteners of that type are unreliable especially under very high pressure conditions since one or more of the fasteners may be less tight than others causing the retaining load to be unequally distributed or carried by the individual fasteners with the result that the more heavily loaded fasteners may break or become loose. Fast acting closure devices have been employed heretofore, but for the most part, have not met with customer acceptance nor with Government regulatory standards which prescribe that each individual fastener for a pressure vessel in locked condition shall remain secure independently of failure of other fasteners. Another important safety requirement for pressure vessels of the type herein contemplated is that before the vessel cover is open, the pressure within the vessel must first be released.

It is an object of this invention to provide a fast acting mechanism coextensive with the periphery of an opening in the wall of an enclosure which is operable to releasably secure a cover or a complementary opening thereto and which will meet the above mentioned requirements.

A further object of the invention is to provide a fastening means operable at a plurality of points around the periphery of an opening to releasably secure a complementary opening in another component thereto.

Another object of the invention is to provide a receptacle having fasteners for securing a receptacle cover or door upon the receptacle shell and having safety means operable to prevent unintended release of the cover in the event of failure of any part of a fastener mechanism.

Still another object of the invention is to provide an improved hinge for hanging a cover upon a receptacle shell which permits axial movement of the cover when the cover is being engaged with or disengaged from the receptacle shell as an incident to removing the cover from the opening.

A still further object of the invention is to provide a securing means operable simultaneously at a plurality of points about an opening to secure a cover or a member having a complementary opening to the first-named opening.

Still another object of the invention is to provide a securing means of the foregoing character which is adapted for use about the periphery of a non-circular opening.

A still further object of the invention is to provide a securing means of the above character which is adapted for use about the periphery of an opening which may be either circular or non-circular and which lies in other than a flat plane.

With the foregoing objects in view, together with such additional objects and advantages as may subsequently appear, the invention resides in the parts, and in the construction, combination and arrangement of parts described, by way of example, in the following specification of certain presently preferred embodiments of the invention, reference being had to the accompanying drawings which form a part of said specification and in which drawings:

FIGS. 1 through 13 relate to an embodiment of the invention comprising a generally circular cover or door for an autoclave or like pressure vessel, including safety devices, and in which;

FIGS. 1 and 2 are respectively, front and side elevations of a pressure-processing apparatus constituting a first embodiment of the invention;

FIG. 3 is a section on an enlarged scale through the lower part of the apparatus shown in FIGS. 1 and 2, the section being taken on line 3—3 of FIG. 1;

FIG. 4 is a detailed section through the hinge part of the apparatus taken along the line 4—4 of FIG. 1;

FIG. 5 is a section along the line 5—5 of FIG. 4;

FIG. 5a is a fragmentary sectional plan view taken on the line 5a—5a of FIG. 5;

FIG. 6 is a sectional view taken on the line 6—6 of FIG. 5;

FIG. 7 is a front view of a portion of the fail-safe mechanism of the apparatus on an enlarged scale showing the relative positions of the parts when the closure member is locked on the opening of the tank or body portion of the apparatus as shown in FIG. 1 with some of the parts shown in section;

FIG. 8 is a vertical section through the fail-safe mechanism taken on line 8—8 of FIG. 1;

FIG. 9 is another front view of the fail-safe mechanism showing the relative positions of parts when the closure member has been rotated slightly on the tank from its locked position with some parts in section;

FIG. 10 is a front view of the fail-safe mechanism showing parts in their relative positions when the closure member is fully released from the tank component;

FIG. 11 is a detailed section through a fastener means taken along the line 11—11 of FIG. 1;

FIG. 12 is a section taken on line 12—12 of FIG. 11;

FIG. 12a is an enlarged scale, perspective view of one of the latch elements, and FIG. 13 is a front view of an actuator for operating the fasteners.

FIGS. 14–18 show the application of the principles of the invention to non-circular openings in which;

FIG. 14 is a plan view of a door or cover in place over an opening but not yet latched to the opening;

Figure 1:
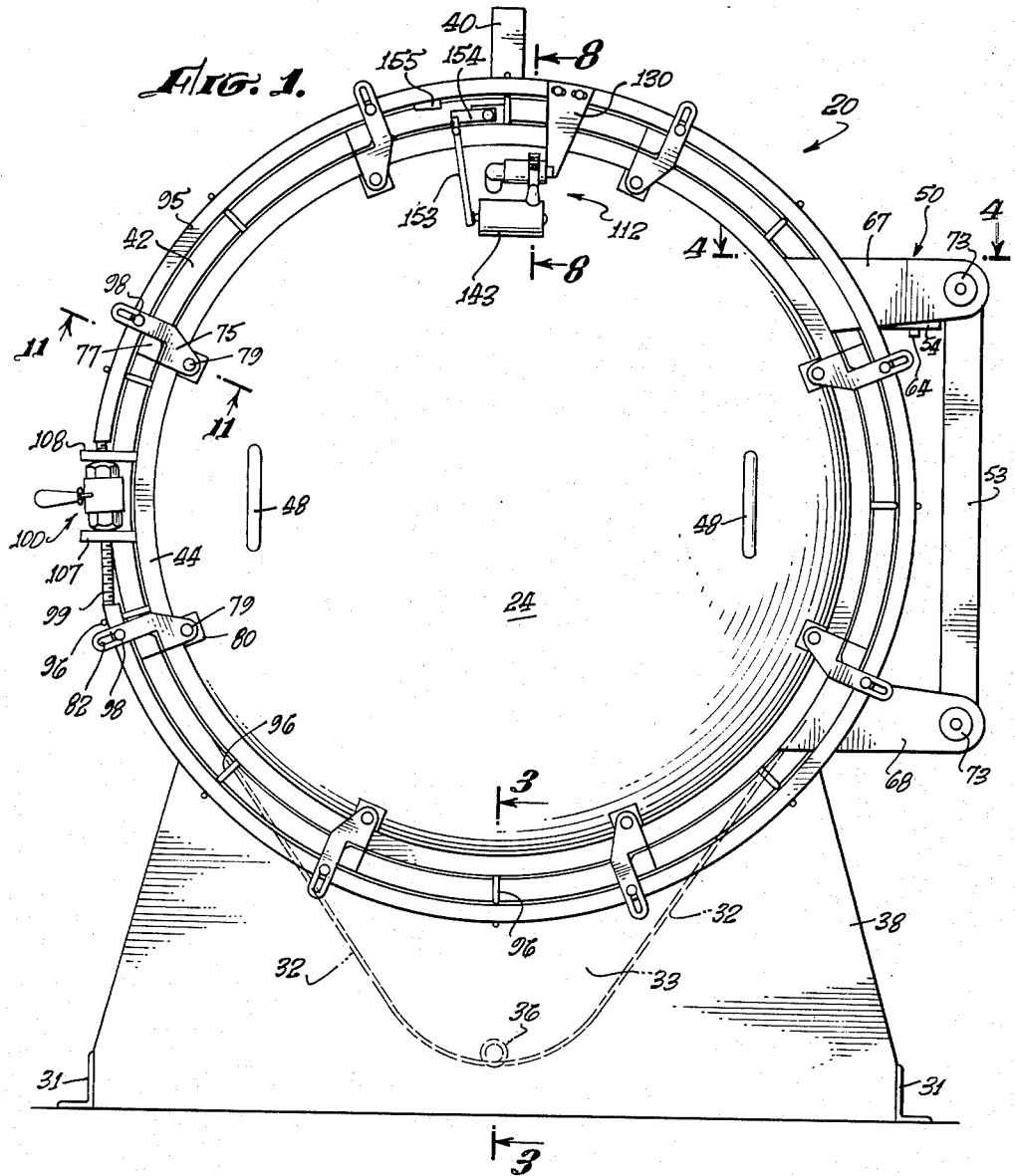

FIGS. 15, 15a and 16 are enlarged scale fragmentary sectional views taken respectively on the lines 15—15, 15a—15a and 16—16 of FIG. 14;

FIG. 17 is an edge view as viewed from the right hand side of FIG. 14, and

FIG. 18 is an end elevational view showing the application of the principles of the invention to a closure means for an opening lying in other than a flat plane;

FIGS. 19–22 show still another embodiment of the principles of the invention particularly useful for coupling the openings of two members together as, for example, the end of large pipes and in which;

FIG. 19 is a side elevation of the embodiment showing a pair of pipes coupled together in end-to-end relation;

FIG. 20 is a section taken on the line 20—20 of FIG. 19;

FIG. 21 is an enlarged fragmentary section taken on the line 21—21 of FIG. 20 showing the ends of the pipes in the process of being positioned for being coupled together, and FIG. 22 is a view similar to FIG. 21 but showing the two pipes coupled together.

Referring to FIGS. 1 through 13 of the drawings there is shown a pressure-processing apparatus, designated generally by reference to numeral 20, having a receptacle 22 for containing articles or material to be pressure-treated, the receptacle comprising a tank 23 and a displaceable closure member or door 24. The tank is formed of a cylindrical circumferential wall 26 closed at one end by an outwardly dished, integrally formed rear end wall 27, and providing at its opposite end a forward end opening 29 spanned by the door 24. Legs 30 with angle iron foot members 31 support the receptacle 22 in a position in which the axis of the cylindrical wall 26 extends horizontally.

In the receptacle the lowermost part of cylindrical wall 26 diverges downwardly from a true circle at 32 and forms a trough 33 for collecting condensate when the apparatus is used with steam as the treating medium. Front and rear plates 34 and 35 form front and rear walls, respectively, for the trough and a nipple 36 closed by a removable plug 37 permits draining. A panel 38 in front of the trough wall 34 spans the space between the legs 30. Fluid under pressure, for example steam, is admitted to the receptacle through a pipe 39 at the top, and the internal pressure being indicated by a pressure gauge 40. When the apparatus is employed as vacuum chamber, the interior of the receptacle may be evacuated through the same pipe 39. A fixed ring 42 encircles the forward end of the peripheral wall 26 of the tank and forms a circular flange extending circumferentially therearound.

Door 24 is formed of an outwardly dished wall 43 and a cylindrical peripheral flange 44 to which it is welded or otherwise suitably secured to provide a fluid tight seal between the door and the tank. An annular seal ring 46 of rubber or equivalent resiliently compressible material is mounted within the forward end of the cylindrical wall 26 of the tank in an annular seat formed by an angle iron 47 having the edge of one leg thereof welded to the inside of the cylindrical wall adjacent to the forward end thereof. The door has two handles 48 preferably diametrically spaced.

Hinge assembly

The door 24 is pivotally mounted at one side of the tank by a hinge assembly generally indicated at 50 in FIGURE 1. Hinge assembly 50 permits swinging of the door between a closed position in which it covers the tank opening 29 and an open position in which it extends outwardly from the tank. The hinge assembly also permits longitudinal or axial displacement of the door toward and away from the tank.

The hinge assembly 50 of the illustrated embodiment comprises an upper hinge 51 (FIGURES 4–6) and a similar lower hinge, the two hinges being interconnected by a vertical member 53. As the hinges are similar, the details of only the upper hange will be described. Upper hinge 51 has two hinge members pivotal with respect to each other, one member being a support lug 54 and the other being a carrier lug 55. The support lug 54 is welded at one of its ends to the wall 26 and flange 42 of the tank 23 and is reinforced by a brace 56. Near its other end the lug 54 has a rectangular opening 57 for receiving a bushing 58. The bushing is T-shaped, having a stem 59 of square cross-section, a head 60 of rectangular configuration, and a bore 61 extending axially through the stem and the head. The bushing stem fits non-rotatably in the rectangular opening 57 and, until secured, is movable longitudinally in the oepning. Set screws 62 serve to secure the bushing in its selected position of adjustment for axial alignment of the bushing with its corresponding member of the lower hinge. The bushing head 60 extends in a direction crosswise of the opening 57 and seats upon lug 54. The other hinge member, i.e., carrier lug 55, of the upper hinge 51 has a pintle 64 extending downward from the lug 55 and into the bushing bore 61. Shims 65 are employed as needed between the bushing 58 and the carrier lug 55. The carrier lug 55 is welded to the vertical member 53 which for the illustrated embodiment is of channel cross-section.

The door 24 is connected to the channel member 53 by upper and lower attachment lugs 67 and 68 and upper and lower guides 69 and 70. The lugs 67 and 68 are welded to the door flange 44 and extend laterally out from its outside surface. The guides 69 and 70 are integral with the channel member 53 and extend forwardly from its ends, respectively. The upper guide 69 extends through a bushing 71 in upper attachment lug 67, and the lower guide 70 extends through a bushing 72 in the lower attachment lug 68 whereby the attachment lugs are slidable axially on their respective guides. Each guide has a stop washer 73 on its forward end to limit forward axial movement of the attachment lugs.

As thus far described, it will be apparent that the hinge assembly 50 permits rotational swinging of the door 24 to and from the tank 23 on the axis of the hinge pintles 64, and permits axial displacement of the door with respect to the tank through sliding of the attachment lugs 67 and 68 on their respective guides 69 and 70.

Fastener assembly

To secure the door in closed position there is a circumferentially arranged series of fasteners comprising latches 75 on the door and a complementary series of catches 77 on the tank, the latches being engageable with and releasable from the catches, respectively, by operating means to be described. The illustrated apparatus has eight latch and catch sets and, as these sets are identical, a description of the structural details of one set will serve for all.

Referring to FIGS. 9, 11 and 12, latch 75 is pivotally monuted on one of its ends on the outside of the door 24 by a bolt 79 secured in a latch mount 80 on the outside surface of the door. The other end of the latch has a slot 82 extending lengthwise of the latch. The latch members 75 (see FIG. 1) extend from their mounting bolts 79 outwardly generally parallel to equally spaced lines radiating from the axis about which the receptacle opening is generated with the ends 82a carrying the slots 82 offset in a clockwise direction as viewed in that figure, thus providing an outwardly facing end surface 84 bordered by the back face 84' which is disposed in a plane parallel to the axis of the bolt 80 and by a front face 85 generally parallel to said back face in a direction parallel to the radial line in which the latch extends and, having reference to FIG. 1, gradually diverging from said back face in a clockwise direction having reference to said FIG. 1, said outwardly facing edge 84, rear face 84' and camming surface 85 as well as the front face 86, combining to form a shoulder 87 adapted to enter a complementary notch in the catch 77 to which reference will presently be made.

The catch 77 as shown best in FIGS. 11 and 12, comprises a short metal bar having one end thereof secured to the tank flange 42 by welding and extending axially of the tank and forwardly of the front surface of the door flange 44. The free end of the catch is provided with a notch 90 extending in a direction circumferentially of the tank, open toward the tank central axis, and adapted to receive the camming surface portion 85 of latch 75. The forward surface 91 of the notch 90 is a cam surface inclined complementally with respect to the cam surface 85 of the latch 75. As the latch 75 is swung on the bolt 75 toward the catch 77, the camming surface 85 of the latch will enter the catch notch 90, and because of the complementally inclined cam surfaces 85 of the latch and 91 of the catch, movement of the latch into the catch notch will displace the latch, the door to which it is connected axially inward with respect to the tank 23 causing the outer end face of the flange 44 to engage the gasket 46. It is to be noted further that the latch mount 80 extends out to the plane of the forwardly facing surface of the door flange 44 whereby the latch 75 is slidable on the flange. Movement of the latch into engagement with the catch thus causes the latch to bear slidingly against the door flange thus to impart the said axial movement to the door directly opposite the engagement with the sealing gasket as the latch becomes more tightly engaged in the catch.

The latches are actuated by a ring 95 carried by the door 24 and guided in spaced concentric relation to the outer end of the flange 44 by a plurality of guides 96 extending radially of the door and having forwardly opening slots 97 in which the ring is retained by the overlying outer ends of the latches 75. Screws 98 carried by the ring engage the slots 82 in the latches so that oscillation of the ring effects simultaneous oscillation of the latches about their respective pivot bolts 79 between engagement and disengagement with the catches 77.

At one point between a pair of adjacent ones of the guides 96 a portion of the ring 95 is cut away and is replaced by a threaded rod 99 carrying a ratchet operated nut means 100 and having its ends connected to the ends of the ring. The illustrated ratchet comprises an internally threaded ratchet hub 101 threadedly engaging the rod 99, a handle 102, a detent 103. Ratchet 100 is of conventional construction in which the detent 103 when displaced in one direction sets the ratchet in a condition such that movement of the ratchet handle in one direction, for example forwardly in FIGS. 1 and 12, will cause the ratchet hub 101 to rotate and to move relatively axially with respect to the screw-threaded section 104. Movement of the ratchet handle in an opposite direction, e.g., rearwardly, will cause the ratchet hub to become operatively disengaged from the screw-threaded section 104 and to rotate free of the screw section until a next forward movement of the handle 102 is effected. Displacement of the detent 103 in a direction opposite to the first-mentioned setting, sets the ratchet in a condition of operative engagement and disengagement of the ratchet hub with the screw-threaded section 104 for a sequence of operations which is the reverse of that described above for the first-mentioned setting of the detent. As it is the actuator ring and not the ratchet which is to be moved circumferentially there are two stops in the form of lugs 107 and 108 projecting outwardly from the door flange 44, one against each end of the ratchet hub 101. The screw-threaded rod 99 of the actuator ring 95 extends through the stop lugs 107 and 108. Thus it is that operation of the ratchet produces longitudinal movement of the rod 99 in the ratchet hub with corresponding rotational movement of the ring 95 in the guides 96. Movement of the actuator ring in a clockwise direction in FIG. 1 causes engagement of the latches with their respective catches, and movement of the actuator ring in a counterclockwise direction causes disengagement of the latches from the catches.

Movement of the actuator ring in a latch-catch release direction (clockwise rotation in FIG. 1) is limited by engagement of the pins 96 againts the outermost ends of the latch slots 82. Movement of the actuator ring in a latch-catch engagement direction (counterclockwise rotation in FIG. 1) is limited by abutment of the latches at their edges 84 against their respective catches, i.e., the position shown in FIG. 1 of the drawing. The latch slots 82 are sufficiently long to allow angular movement of the latches on their respective pivots 79 away from their respective catches 77 to an extent which is greater than the dimension of the wedge portions 85 measured circumferentially with respect to the door 24, so that the leading edge corners 87 of the camming faces 85 will be spaced slightly, as by gaps 110, (FIGS. 10 and 13) from the adjacent ends of the complementary camming faces 91 of the catches with which they are associated to clear the catches for release of the door from the receptacle tank. The door is not free for release from the tank when any part of any of the latches extend into their respective catch notches.

The fail-safe mechanism

An important feature of this invention is that it provides a means for preventing unintended release of the door 24 from the tank 23 even though one or more parts of the fastener means, i.e., latches 75, catches 77, and actuator ring 95, should break or otherwise fail. This safety feature prevents disengagement of the latches from their respective catches in the event of failure of any of the parts and prevents opening of the door until after the pressure in the tank reaches atmospheric pressure. In the illustrated embodiment (FIGS. 1, 7, 8 and 9) the mechanism of this safety feature comprises a valve assembly, designated generally by reference numeral 112, which opens upon movement of the latch actuator ring 95 in the latch-release direction, indicated by arrow 113 in FIG. 9, to conduct fluid under pressure from inside the tank to a locking mechanism, presently to be described, for locking the actuator ring against further movement in a direction toward the latch release position of FIGS. 10 and 13.

Valve assembly 112 comprises a cylinder 115 in which piston 116 is reciprocable, said piston carrying a sealing gasket 116' engaging the cylinder wall. One end 117 of the cylinder, herein referred to as the inner or upstream end, is connected to a pipe elbow 118 which extends into an opening 119 formed in the wall 43 of the door. Cylinder 115 also has an outlet port 121. The piston 116 is movable between an inner or upstream position with respect to the outlet port 121 (FIG. 7), and an outer position (FIG. 9), in which the piston has cleared at least part of the outlet port. The piston is under pressure of a compression spring 122 which urges it in a direction toward the outer end 123 of the cylinder to open the port 121 to flow of fluid from the opening 114. A plug 125 in the outer end of the cylinder has a bore 126 extending through it, and a push rod 127 movable axially in the bore, secured to the piston as by a nut 128.

The outer end of the push rod 127 is engageable with a radially inwardly extending arm 130 carried by the latch actuator ring 95 and terminating in a tip 131 aligned with the push rod 127. The arm 130 is secured to the actuator ring 95 by bolts 133 extending through slots 134 in the arm to permit circumferential adjustment along the actuator ring.

An annulus 136 surrounds the cylinder 115 and covers the outlet port 121 (FIGS. 7, 8 and 9), and is clamped up on the cylinder by means of a screw 137 in end ears 138 of the annulus, an elastomer insert 140 serving to seal the ends of the annulus. The annulus also has a tubular throat 141 forming a conduit for fluid under pressure from the outlet port 121 to a cylinder 143; said annulus (see FIGS. 2 and 8) serving also as a bracket supporting the cylinder 143 in a desired position rotatively and longitudinally of the axial line of the cylinder 115.

Cylinder 143 has a fluid inlet port 144 in its side wall adjacent an end wall 145 opening to the annulus throat 141 to which the cylinder is welded, brazed or otherwise secured for support. A plurality of fluid outlet ports 146 are formed in the side wall of the cylinder proximate the opposite end wall 147. A piston 149 carrying a piston rod 150 is movable axially in the cylinder 143 between a position (FIG. 7) just downstream of the inlet port 144 and a position (FIG. 9) downstream of the outlet ports 146. A stop 151, here in the form of a screw extending inwardly from the end wall 145, prevents movement of the piston 149 in an upstream direction beyond the inlet port 144. The end wall 147 serves as a bearing for the piston rod to maintain the piston rod axially in the cylinder.

The piston rod 150 engages one end of a trip lever 153 (FIG. 9) to actuate said trip lever to release a lock lever 154 to swing into the path of a stop 155 on the actuator ring 95 so as to prevent rotation of said actuator ring to effect disengagement of the fastener latches 75 from their catches 77 prior to release of fluid pressure in the receptacle 22. Adjacent to the end of the trip lever 153 remote from the piston rod 150, it is pivotally attached to the door flange 44 by a screw 156 to provide a long lever arm 157 and a short lever arm 158. The long lever arm extends radially inward from the door flange 44 sufficiently to position a pad 159 carried thereby in the path of reciprocation of the outer end of the piston rod 150. The short lever arm 158 is formed with a hook 161 engageable with a projecting pin 162 constituting a detent means on the lock lever 154.

One end of lock lever 154 is pivotally mounted by a screw 163 extending parallel to the screw 156 and engaging a block 164 fastened to the outside of the door flange 44 by screws 165. The lock lever is biased to swing on its pivot 163 away from the outside surface of the door flange 44 by a compression coil spring 167 having one end housed in a bore 168 in the lock lever 154 and the opposite end engaging the outer surface of the flange 44; said spring thus serving to swing the lock lever outwardly when the hook 161 of the trip lever 153 is released from the forwardly projecting pin 162 on the lock lever 154.

Reviewing briefly, the mode of operation of the fail-safe mechanism, it is observed that the actuator ring 95 is movable back and forth circumferentially of the door in a path of travel determined by the threaded rod 99 and ratchet nut means 100, one end of said path being a fastening position (see FIGS. 1, 11 and 12) in which the latches 75 are fully engaged with their respective catches 77, and the other end of said path being the releasing position shown in FIGS. 10 and 13 in which the latches are disengaged and clear of their respective catches. In an intermediate position between the fastening and releasing positions which may be called a holding position and is shown in FIG. 9, the latches 75 are sufficiently engaged with their respective catches 77 to prevent the door from being opened but are not completely seated in their fastening position; said holding position being characterized by the fact that the actuator ring 95 is displaced from the fastening position sufficiently so that the lock lever 154 is released and engages the stop 155, and thus prevents movement of the actautor ring from its fastening position.

Starting from the fully closed position of the door shown in FIG. 1, to open the door, the ratchet 100 is operated to move the actuator ring 95 clockwise as there shown. The rigid arm 130 carried by ring 95 moves from the valve cylinder 115 with the result that the piston 116 and piston rod 127, acting under the bias of spring 122 supplemented by any pressure within the tank acting on its face and received through the opening 119 leading to the interior of the tank will uncover the port 121 and allow fluid pressure from within the tank to flow into cylinder 143 moving the piston 149 and piston rod 150 to the left as viewed in FIG. 9, and the piston swinging the trip lever 153 clockwise on its pivot pin 156 and releasing hook 161 at opposite end of the lever from the pin 162 carried on the lock lever 154. This frees the lock lever to swing outwardly in response to the bias of spring 167 against the inside surfaces of the actuator ring 95. When the stop 155 on the actuator ring 95 reaches the lock lever 154, further movement of the ring toward its releasing position, as shown in FIG. 9, further movement of the actuator ring in a clockwise direction is prevented, and the parts are in their holding positions. At this point (see FIG. 9) the latches 75 have been moved only slightly and are still in engagement with their respective catches 77, wherefore, the door cannot be opened.

Referring again to the cylinder 143 of the valve assembly 112, its piston 149 in its movement to the left in FIG. 9 under the force of fluid pressure from the cylinder 115 passed and uncovered the outlet ports 146 enabling the gas under pressure to escape. Upon the pressure within the tank reaching atmospheric pressure as a result of the escape of pressure through interconnected cylinders 115 and 143 to atmosphere, indicated by the gauge 40 or the cessation of flow through ports 146, the trip lever 153 may be swung back by hand from its position of FIG. 9 to displace the piston 149 to its original position against the stop screw 151 as shown in FIG. 7. The lock lever 154 is then retracted by hand from its position in engagement with the stop 155 and is secured in its retracted position by the hook 161 of the trip lever and the actuator ring 95 is then free to be further displaced by the ratchet 100 in a clockwise direction to swing the latches 75 clear of their respective catches 77, thus freeing the door to be opened.

By pulling on the door handles 48 the door is first moved bodily outwardly from the tank along the guides 69 and 70. This initial axial movement of the door prevents mutilation of the tank seal 46 which would otherwise occur were the door capable of pivotal movement only.

To again secure the door to the tank, the door is first swung on its hinge pivots 64 until it lies in a plane parallel to the open end of the tank and is then pushed axially, sliding upon the guides 69 and 70, into contact with the tank seal 46. The ratchet 100 is then operated to displace the actuator ring 95 in a counterclockwise direction, as viewed in FIG. 1 for latch-catch interengagement. When the latches have been swung by the actuator ring into full engagement with their respective catches and with the edges of the latches in abutment against the catches, the rigid arm 130 by engagement with piston rod 127 will have returned the piston 116 to a position upstream of the port 121, thereby sealing the interior of the tank to the exterior atmosphere. Additionally, the movement of the catches 75 into full engagement with the catches 77 integral with the tank side wall 26 (FIGURE 11) affects the camming of the door into sealing abutment with the tank 23, and more particularly the peripheral flange 44 of the door with the sealing ring 46 which encircles its forward open end, under the action of the sloping cam surfaces 86 and 91, (FIG. 12) of the latch and catch, respectively. All parts are then in their positions of FIGS. 1 and 7, and the tank is ready to be charged with fluid under pressure, and the door cannot be opened thereafter without first releasing the pressure by the operation of the fail-safe mechanism 112 as described.

FIGS. 14–18 show a modified form of the invention and illustrate that (a) the principles of the invention are not limited to closures for circular openings (b) that various types of power means may be used to effect the multiple point latching and unlatching of the cover or other attachment to the opening and (c) that the operating means may be on the door component and be disposed inwardly of the latch operating member.

Considering first FIGS. 14–17 there is shown a door 200 covering a polygonal opening in a wall 201; said door having upper and lower bracket arms 202 projecting from an edge thereof and terminating in sleeves 203 which slidably engage the horizontally extending arms 204 of hinge pins 205; said pins terminating in axially aligned end portions 206 extending at right angles to the arms 204 which pivotally engage hinge brackets 207 projecting from the wall. Mounted adjacent the corners of the door on the outer face thereof are sheaves 208 carried by studs 209 and trained over said sheaves is a cable or other flexible member 210 having the ends thereof joined in any suitable manner as for example, that shown in FIG. 16 to be described in detail. Mounted on the wall 201 at spaced intervals adjacent the periphery of the door are latch engaging catches 211 having notches 212 provided in the faces thereof adjacent to the door; said notches being provided with sloping, latch-engaging faces 213 in a manner generally similar to the engagement of the catches 77 of the first embodiment of the invention. Bolts 214 on the face of the door pivotally mount latch levers 215 at the midlengths thereof; each of said levers having an end projecting beyond the edge of the door which is provided with a sloping, catch engaging surface 216 adapted to engage the corresponding surfaces 213 of the catches 211 as will be presently described. The other ends of each of the levers are pivotally connected by screws 215' to one each of a series of sleeve elements 217 carried by the cable 210, each sleeve being secured thereon by a pair of tapered split nuts 218 threadedly engaging tapered threaded ends of said sleeve by which said nuts are caused to be compressed to grip the cable 210. One of said sleeves may serve to connect the ends of the cable as shown in FIG. 16.

In the illustrated embodiment, as the cable is caused to move in a clockwise direction, the levers 215 are moved in a counterclockwise direction causing the latch ends thereof to engage the sloping faces 213 of the catches 211 causing the door to engage the sealing gasket 219 which surrounds the opening. Alternatively, the gasket means could be mounted on the door, if desired, or it could be dispensed with if sealing against pressure were not involved.

Any suitable means for actuating the cable 210 may be employed. For example, a fluid pressure means is shown comprising a double acting, fluid pressure responsive cylinder and piston assembly 220 having the cylinder fixed to the door and the piston rod connected to a bracket arm 221 projecting from a sleeve 217' which, otherwise, is similar to the sleeves 217 above described. As a matter of fact, if desired, one of the sleeves 217 might be employed both to operate one of the latching levers and to provide the bracket arm for actuation by the fluid pressure means. Control means might include a four-way valve 222 interposed in the pressure lines 223 and return line 224.

Obviously, with the latches disengaged, the door may be moved bodily outwardly on the hinge member arms 204 and then swung to open position. When the door is closed and moved into position to be locked by the said latch and catch means, the sliding of the door on the arms 204 allows it to float into alignment for interengagement of the latching means in the same manner as in the first described embodiment. Also, while a fluid pressure means is shown for operating a cable to actuate the latches any other power means might be employed or any suitable manually operated means which would apply the necessary force endwise of the cable to cause it to move with the required amount of force to achieve the degree of locking pressure deemed to be necessary.

FIG. 18 shows a modification to illustrate that the invention is not limited to use with openings lying in a flat plane. In this figure, there is shown a curved wall 250 having a correspondingly curved door 251 closing an opening in said wall with an interposed gasket means 252. The door carries hinge means similar to that shown in FIGS. 14 and 17 comprising brackets 253 carrying sleeves 254 slidably engaging arm portions 255 of hinge members 256 which are pivotally mounted in brackets 257 projecting from the wall 250. A cable 258 is trained over sheaves 259 at each corner of the door and is caused to follow the arcuate configuration of the door by interposed sheaves 260 carried by brackets 261 mounted on the door. The cable is shown carrying sleeve elements 217 which cause connected latch levers 215 to engage and disengage catch elements 211 in the same manner as in the embodiments shown in FIGS. 14 and 17. The operating means for the cable is not shown as it may be any form either like that shown in the preceding figures or any of the others suggested in connection therewith.

Referring finally to FIGS. 19–22, it is to be borne in mind that the present invention is primarily concerned with connecting something to an opening and that whatever is thus connected may be a closure means or it may be another member having an opening extending therethrough, it being obvious that the closure elements shown in the preceding figures could have openings extending therethrough connected to conduit means or the like. Those embodiments contemplated an arrangement wherein the element, generally referred to as a door, remains secured to the wall or body structure by a hinge means. As will be seen in the embodiment now about to be described, the hinged mounting is not an absolute essential. For purposes of illustration, this last embodiment is shown as connecting two tubular members together in sealed, end-to-end relation but it will be realized that just as the "doors" of the previous described embodiments may be provided with openings, so one of the elements of the final embodiment here disclosed might, if desired, be in the form of a closure means for the other element. The essential difference is the fact the connected elements have similar, multiple point, cam type latching means that are not hingedly or otherwise connected when the latching means is disengaged.

The illustrated form of this final embodiment of the invention contemplates means for quick connection and disconnection of the ends of pipes designated A and B. Pipe A is provided with an annular flange 300 at the end thereof serving as an abutment, retainer and locator for the loosely mounted catch carrying ring 301 which is provided with a plurality of catch members 302 projecting therefrom parallel to the pipe and projecting beyond the end thereof; each of said catch members being provided at the distal end thereof with a latch receiving notch 303 having a sloping cam face 304 similar to the sloping faces of the catch members of the preceding embodiments of the invention and adapted to be engaged by latch means carried by pipe B.

Adjacent to the end of pipe A, the flange 300 is provided with a gasket engaging face 305 adapted to be engaged by a gasket 306 interposed between it and the complementary face 307 on an annular flange 308 welded or otherwise secured to the adjacent end of pipe B. As here shown, the gasket is adhered to the gasket face 307 of the flange 308, but it will be understood that the gasket may be of any nature suitable to the sealing problem involved and that while the faces are shown as abutting, they may be interfitting with the gasket interposed between coaxial faces thereof if desired.

The flange 308 is of greater diameter than the flange 300 and is provided with a series of slots 309 extending therethrough parallel to the axis of the pipe B and through which slots the distal ends of the catch members 302 project when the pipes A and B are brought into abutting relation with the ring 301 in contact with the rear face of the flange 300. Mounted for rotative movement on the outer face of the flange 308 is the latch operating ring 310 which at the rear side thereof is provided with a series of screws 311 which extend through slots 312 in the outer end of latch members 313, the inner ends of which latch members are pivotally mounted on screws 314 carried by the flange 308. In general, the latch members resemble the latch members 75 of the first described form of the invention and include an offset camming surface 315 engageable with the meeting cam surface 304 of the complementary catch members 302 which project through the slots in the flange 308 and similarly apply a wedging action bringing the pipes together as the operating ring 310 is caused to move along the outer surface of the flange 308.

The means for operating the latch operating ring may be such as is suitable for the duty imposed. In the illustrated embodiment, a bracket 316 is secured by screws 317 to one side of the flange 308 between adjacent ones of a pair of the latch members 313 said bracket providing spaced bearings 318, 318 closed by removable caps 319, 319 for a shaft 320 carrying a worm 321 disposed between said bearings; said shaft beyond one of said bearings being provided with a hand wheel 322 for manual operation thereof and said worm meshing with a series of teeth 323 preferably formed integrally with and on the outer surface of the ring 310.

Rotation of the worm in one direction will cause the ring to actuate the latches to engage the catch members and in the opposite direction to release them. Due to the fact that the catch members are mounted on a loosely mounted ring, it is unnecessary to rotate either pipe to bring the interlocking means into alignment. Also, while this embodiment is shown as a means for connecting two pipes, it will be realized that one of the elements might be a loose cover or lid as distinguished from the hinge construction of the preceding embodiments.

One important principle which runs through all embodiments of the invention is the fact that the means for rotating the latches is never subjected to the strains to which the connected members may be caused to resist. Moreover, in all forms, the joint or junction is secured simultaneously at a plurality of points. Further, the latching means may be operated by means disposed either outside of the perimeter of the opening being closed as in the first and last embodiments or interiorly thereof as in the second embodiment. Still further, the principles of the invention can be applied to every conceivable configuration of opening. While it is not shown in the second and third embodiments of the invention, the principles of the fail-safe devices shown applied to the first embodiment of the invention can obviously be incorporated therewith and also, while it is not shown in the drawings, the operating means for closing and opening the latch devices may be remotely disposed as, for example, the operating valve for the cylinder in the second embodiment of the invention may be located at some point remote from the door itself. While in some instances in the foregoing specification the term "door" has been employed, this term will be understood to include any element which is secured by the use of the mechanism and principles of the invention over an opening whether the secured element constitutes a closure, per se, or carries some other conduit means which is being connected to the opening to which it is thus detachably mounted.

While in the foregoing specification, certain presently preferred embodiments of the invention have been disclosed by way of example, the invention is not to be deemed to be limited to the precise details of construction thus disclosed and it will be understood that the invention includes as well all such changes and modifications in the parts and in the construction, combination and arrangement of parts as shall come within the purview of the appended claims.

I claim:

1. Apparatus comprising two members to be releasably secured together, a latch on one of said members, a catch on the other of said members engageable by the latch, the latch being reciprocable in a course of movement including a fastening position at one end of said course in which the latch and catch are tightly interengaged to secure said members together, a releasing position at the other end of said course in which the latch is disengaged from the catch and said members are free to be separated, and a holding position between said fastening and a releasing position in which the latch and catch are interengaged sufficiently to prevent release of one of said members from the other member, a lock element movable on one of said members spring means biasing said lock element for movement into a position preventing unlocking of said latch, detent means normally holding said lock element out of said latch unlocking preventing position, and means operatively connected to said latch and to said detent means operable to release said detent means with resultant spring bias movement of said lock element for moving the lock element into said locking position when said latch is moved from said fastening position to said holding position.

2. Apparatus comprising two members to be releasably secured together, a latch, a catch on one of said members engageable by the latch, an actuator for the latch carried by the other of said members and reciprocable in a course of movement including a fastening position of the actuator at one end of said course in which the latch and catch are tightly interengaged to secure the said members together, a releasing position of the actuator at the other end of said course in which the latch is disengaged from the catch and said members are free to be separated from each other, and a holding position of the actuator between said fastening and said releasing position in which the latch and catch are interengaged sufficiently to prevent release of one of said members from the other member, a lock element movable on one of said members, into and out of engagement with said actuator, spring means normally tending to move said lock element into the path of movement of said actuator for engagement thereby, detent means normally holding said lock element out of the path of said actuator against the bias of said spring means, and means operatively connected to said actuator and to said detent means operable to release said detent means with resultant spring bias movement of said lock element for moving said lock element into engagement with said actuator when said actuator is moved from said fastening position to said holding position.

3. Apparatus comprising a receptacle having a tank member with an opening and having a closure member for covering the tank opening, a latch, a catch on one of said members engageable by the latch, an actuator for the latch carried by the other of said members and reciprocable in a course of movement including a fastening position of the actuator in which the latch and catch are tightly interengaged to secure the closure member to the tank member, a releasing position of the actuator in which the latch is disengaged from the catch to permit moving of the closure member from covering said tank opening, and a holding position of the actuator between said fastening and releasing positions and in which the latch and catch are interengaged sufficiently to prevent unintended opening of the closure member, a lock element on the receptacle movable between a locking position and an unlocking position, said locking position being one in which said lock element operatively engages the latch actuator and limits movement of the latch actuator beyond said holding position toward said releasing position, said unlocking position being one in which said lock element is free from the path movement of the latch actuator, and means operatively connected to the latch actuator and to said lock element for moving the lock element to said locking position when the latch actuator is moved from the said fastening position to said holding position.

4. Apparatus comprising two members to be releasably secured together, a ring carried by and extending circumferentially of one of said members, means for imparting rotary movement to the ring, a circumferentially extending series of latches connected to the ring, a circumferentially extending series of catches on the other of said members and equal in number to and aligned respectively with the latches, the latches being engageable with catches respectively, the ring being reciprocably movably rotatively about the axis of the ring from a fastening position in which said latches and catches are tightly interengaged to secure the said members together and a releasing position of the ring in which the latches are disengaged from their respective catches to free one of said members from the other.

5. Pressure processing apparatus comprising a receptacle having a tank member with an opening and a closure member for covering the tank opening, a latch, a catch on one of said members engageable by the latch, an actuator for the latch carried by the other of said members and reciprocable in a course of movement, a fastening position of the actuator at one end of said course in which the latch and catch are tightly interengaged to secure the closure member tight to the tank member, a releasing position of the actuator at the other end of said course in which the latch is disengaged from the catch to permit moving of the closure member from covering said opening, and a holding position of the actuator between said fastening and releasing positions and in which the latch and catch are interengaged sufficiently to prevent opening of the closure member, and fail-safe means for preventing unintended release of the closure member from the tank member and comprising a valve having a fluid inlet open to the inside of the receptacle said latch actuator being engageable with said valve to close said valve when said actuator is in said fastening position and to open said valve when said actuator is moved from said fastening position to said holding position, and a lock element operatively associated with the valve and movable from a position of disengagement with said actuator when said valve is closed to a position of locking engagement with said actuator when the valve is open.

6. A receptacle comprising a tank member with an opening and a closure member for covering the shell opening, fastener means for securing said members together and comprising a ring carried on one of said members and extending circumferentially of the receptacle means for imparting rotary movement to the ring, a circumferentially extending series of latches connected to the ring, a circumferentially extending series of catches on the other of said members and equal in number to and aligned respectively with the latches, the latches being engageable with the catches, respectively, the ring being reciprocably movable rotatively about the axis of the ring from a fastening position for the ring in which the latches and catches are tightly interengaged to secure the closure member tight to the tank member, and a releasing position of the ring in which the latches are disengaged from the catches to permit moving of the closure member from covering said tank opening, and a holding position of the ring between said fastening and releasing positions and in which the latches and catches are interengaged sufficiently to prevent unintended release of said members one from the other and in which said ring is locked against further movement toward said releasing position.

7. A fastening assembly comprising two members to be releasably secured together, a ring extending circumferentially of one of said members, means for imparting rotary movement to the ring, a circumferentially extending series of latches pivotally connected to one of said members and slidably connected to the rings, a circumferentially extending series of catches on the other of said members and equal in number to and aligned with the latches respectively, for each set of the aligned latches and catches, the catch having a notch and the latch having a portion receivable in said notch, a catch surface which defines said notch being slidably engageable by a surface of said latch portion, one of said surfaces being an inclined cammed surface to produce relative movement of said members toward each other as said latch portion moves into said catch notch.

8. A fastening assembly comprising two members to be releasably secured together, a ring extending circumferentially of one of said members, a circumferentially extending series of latches pivotally connected to one of said members and slidably connected to the ring, a circumferentially extending series of catches on the other of said members and equal in number to and aligned with the latches respectively, for each set of aligned latches and catches, the catch having a notch and the latch having a portion receivable in said notch, a catch surface which defines said notch being slidably engageable by a surface of said latch portion, one of said surfaces being an inclined cammed surface to produce relative movement of said members toward each other as said latch portion moves into said catch notch, and means for imparting rotary movement to said ring comprising a screw threaded section of said ring, a ratchet element operatively connected to said section for imparting axial movement to said section, and a stop on one of said members engageable with said ratchet element for preventing movement of the ratchet element in a direction of movement axially of said section.

9. Apparatus comprising two members, one member defining an opening and the other member defining a closure for said opening, and a hinge pivotally interconnecting the members for permitting relative swinging of the members on a hinge axis between a closed position of the members adjacent each other and an open position of the members angularly disposed and for permitting relative axial movement of the members, said hinge comprising two attachment parts secured to said members, respectively, a shaft pivotally connected to one of said parts, the axis of the pivotal connection of the shaft and said one part being said hinge axis, the shaft extending in a direction parallel to that of said axial movement of the movable member, the other of said attachment parts being slidable axially on the shaft and means operable to simultaneously releasably secure said closure member to said opening defining member at a plurality of points along the juncture of said members defining said opening.

10. A receptacle comprising a tank member having an opening and a closure member for covering the tank opening, and a hinge adjacent one side of the tank member and pivotally interconnecting said members for permitting swinging of the closure member on a hinge axis between a closed position of the closure member covering the tank opening and an open position of the cover extending angularly with respect to the tank member and for permitting movement of the closure member axially toward and away from said tank member, said hinge comprising two attachment parts secured to said members, respectively, a shaft pivotally connected to one of said parts, the axis of the pivotal connection of the shaft and said one part being said hinge axis, the shaft extending in a direction parallel to that of said axial movement of the closure member, the other of said attachment parts being slidable axially on the shaft, and means operable to simultaneously releasably secure said closure member to said tank member at a plurality of points along the juncture of said closure member with the portion of said tank member defining said opening.

11. A receptacle comprising a tank member having an opening and a closure member for covering the tank opening, a hinge adjacent one side of the tank member and pivotally interconnecting the members for permitting swinging of the closure member on a hinge axis between a closed position of the closure member covering said tank opening and an open position of the closure member extending angularly with respect to the tank member and for permitting movement of the closure member axially toward and away from said tank member, said hinge comprising a pair of hinge elements projecting sidewardly from the tank member and aligned with each other in the direction of said hinge axis, a pair of hinge elements projecting sidewardly from the closure member and aligned with each other in the direction of said hinge axis, two shafts pivotally connected to said elements, respectively, of one of said pairs, the axes of said pivotal connections being aligned with each other and being said hinge axis, the shafts extending parallel to each other and in a common direction parallel to that of said axial movement of the closure member, the hinge elements of one of said pairs being carried by and slidable axially on the shafts, respectively, and means operable to simultaneously releasably secure said closure member to said tank member at a plurality of points along the juncture of said closure member with the portion of said tank member defining said opening.

12. Apparatus comprising two members, one of said members defining an opening and the other of said members defining a closure therefor and a hinge pivotally interconnecting the members for permitting relative swinging of the members on a hinge axis between a closed position of the members adjacent each other and an open position of the members angularly disposed and for permitting relative axial movement of the members said hinge comprising two attachment parts secured to said members respectively, one of said parts having a slot extending longitudinally toward and away from said members, a bushing non-rotatable in the slot and adjustable longitudinally in the slot, the bushing having a flange extending transversely with respect to the slot for seating on said one attachment part, a hinge pin rotatable in said bushing, a shaft connected to said pin and extending in a direction transversely of the longitudinal axis of said slot, the other of said attachment parts being slidable axially on the shaft and means operable simultaneously to releasably secure said closure member to said opening defining member at a plurality of points along the line of juncture of said members incident to closing of said opening.

13. A fastening assembly comprising two members to be releasably secured together, a ring extending circumferentially of one of said members, means for imparting rotary movement to the ring, a circumferentially extending series of latches pivotally connected to one of said members and slidably connected to the ring, a circumferentially extending series of catches on the other of said members and equal in number to and aligned with the latches respectively, for each set of aligned latches and catches, the catch having a notch and the latch having a portion receivable in said notch, a catch surface which defines said notch being slidably engageable by a surface of said latch portion, one of said surfaces being an inclined cammed surface to produce relative movement of said members toward each other as said latch portion moves into said catch notch, and a hinge pivotally interconnecting the members for permitting relative swinging of the members on a hinge axis between a closed position of the members adjacent each other and an open position of the members angularly disposed and for permitting relative axial movement of the members, said hinge comprising two attachment parts secured to said members respectively, a shaft pivotally connected to one of said parts, the axis of the pivotal connection of the shaft and said one part being said hinge axis, the shaft extending in a direction parallel to that of said relative axial movement of the members, one of said attachment parts being slidable axially on said shaft.

14. Pressure processing apparatus comprising a receptacle having a tank member with an opening and a closure member for covering the tank opening, a latch on one of said members, a catch on the other of said members engageable by the latch, the latch being reciprocable in a course of movement between a latch-catch engagement position for securing the closure member to the tank member and a latch-catch release position permitting opening of the closure member, and a tank venting position of the latch between said engagement and disengagement positions, a valve having a fluid inlet open to the inside of the receptacle and having a gas escape port for venting gas from the receptacle, said latch being operatively associated with the valve to close said valve when the latch is in said engagement position and to open said valve when said latch has been moved to said tank venting position.

15. Apparatus comprising a receptacle adapted to contain gas under pressure, an opening in said receptacle, a cover for said opening and means for releasably securing said cover on said opening, a hollow cylinder connected to the outside of the receptacle and open at an upstream end of the cylinder to flow of gas from inside the receptacle, the cylinder having an outlet port in a downstream end of the cylinder, a piston movable in the cylinder from a position upstream of the outlet port to a downstream position uncovering the outlet port and permitting escape of gas from the receptacle to the atmosphere, means for releasably maintaining said piston in its said upstream position, and means controlled by said piston effective to prevent release of said securing means at all times when said receptacle is subjected to interior pressure.

16. Apparatus comprising a receptacle adapted to contain gas under pressure, an opening in said receptacle, a cover for said opening, means for releasably securing said cover on said opening, a hollow cylinder connected to the outside of the receptacle and open at an upstream end of the cylinder to flow of gas from inside the receptacle, the cylinder having an outlet port in a downstream portion of the cylinder, a piston movable in the cylinder from a position upstream of the outlet port to a downstream position uncovering the outlet port and permitting escapt of gas from the cylinder, means for releasably holding said piston in its said upstream position and means controlled by said piston effective to prevent release of said securing means at all times when said receptacle is subjected to interior pressure, said last named means including a second hollow cylinder having an inlet port adjacent one end and an escape port adjacent an opposite downstream end, a conduit interconnecting the outlet port of said first cylinder to the inlet port of said second cylinder, a piston movable in the second cylinder from a position intermediate the inlet port of the second cylinder and said escape port to a position downstream of the escape port, and locking mechanism operatively associated with said second piston and with said releasably holding means for limiting movement of said releasably holding means following a predetermined extent of movement of said second piston.

17. Apparatus comprising a receptacle adapted to contain the gas under pressure having a tank member with an opening and a closure member for covering the tank opening, a hinge pivotally interconnecting said members, a latch, a catch on one of said members engageable by the latch, an actuator for the latch carried by the other of said members and reciprocable in a course of movement including a fastening position of the actuator in which the latch and catch are tightly interengaged to secure the closure member to the tank member, a releasing position of the actuator in which the latch is disengaged from the catch to permit moving of the closure member from covering said tank opening, and a holding position of the actuator between said fastening and releasing positions and in which the latch and catch are interengaged sufficiently to prevent unintended opening of the closure member, a hollow cylinder connected to the outside of the receptacle and open at an upstream end of the cylinder to flow of gas from inside the receptacle, the cylinder having an outlet port in a downstream portion of the cylinder, a piston movable in the cylinder from a position upstream of the outlet port to a downstream position uncovering the outlet port and permitting escape of gas from the cylinder, means on said actuator for releasably holding said piston in its said upstream position, a second hollow cylinder having an inlet port adjacent one end and an escape port adjacent an opposite downstream end, a conduit interconnecting the outlet port of said first cylinder to the inlet port of said second cylinder, a piston movable in the second cylinder to a position adjacent said escape port, and a locking mechanism operatively associated with said second piston and with said releasably holding means for limiting movement of said actuator at said holding position.

18. A releasable connecting device comprising a first member having an opening therein and having a plurality of similar components of a plurality of latching devices disposed in spaced relation from each other and substantially uniformly disposed in spaced relation to the periphery of said opening, a second member having a plan configuration generally similar to but larger than said opening and having the complementary components of said latching devices mounted thereon for engagement with and disengagement from said first named components of said latching devices with consequent securing of said members together or releasing them from engagement with each other, and means on one of said members operable optionally to actuate all of the latch device components on said one member simultaneously to engage the complementary latching devices on the other of said members or to effect simultaneous disengagement therewith.

19. A connecting device as claimed in claim 18 in which one of said members constitutes a cover for the opening in the other of said members.

20. A connecting device as claimed in claim 18 in which said members constitute a pair of tubular members releasably connected in end-to-end relation by said plurality of latching devices.

21. A connecting device as claimed in claim 18 in which each of said latching devices comprises a catch component fixedly mounted on one of said members and a relatively movable latch component mounted on the other of said members; each of said components having complementary sloping interengaging faces effective to secure said members together with a wedging action effected by relative movement between said sloping interengaging faces.

22. A connecting device as claimed in claim 21 in which the opening in said first member is non-circular in configuration and in which said latch components are moved simultaneously into and out of engagement with said catch components by an actuator means of corresponding non-circular configuration attached to all of said latch components and mounted on the one of said members carrying said latch components, said actuator means being operable to effect simultaneous movement of said latch components for engagement or disengagement with the complementary ones of said catch components on the other of said members.

23. A connecting device as claimed in claim 21 in which the opening in said first member is disposed on a surface of said first member which lies in other than a flat plane, and in which said latch components are moved simultaneously into and out of engagement with the complementary catch components by an actuator means disposed in a plane parallel to the plane of said opening attached to all of said latch components and mounted on the one of said members carrying said latch components; said actuator means being operable to effect simultaneous engagement or disengagement of all of said latching components with the complementary ones of said catch components on the other of said members.

References Cited by the Examiner

UNITED STATES PATENTS

| | | | |
|---|---|---|---|
| 1,519,780 | 12/1924 | Klohs | 220—55 |
| 2,216,012 | 9/1940 | Jacob | 292—45 |
| 2,706,999 | 4/1955 | Pickard | 220—55.3 |
| 2,961,695 | 11/1960 | Fradd | 16—179 |
| 2,970,718 | 2/1961 | Jennings | 220—55.3 |
| 3,044,106 | 7/1962 | Papsdorf | 16—179 |
| 3,107,810 | 10/1963 | King | 220—55.3 |
| 3,144,957 | 8/1964 | Anderson | 220—55.3 |

FOREIGN PATENTS

| | | |
|---|---|---|
| 412,700 | 7/1934 | Great Britain. |
| 439,989 | 12/1935 | Great Britain. |

THERON E. CONDON, *Primary Examiner.*

GEORGE O. RALSTON, *Examiner.*